No. 611,076. Patented Sept. 20, 1898.
F. H. NIES & W. DUNN.
GEAR CASE FOR BICYCLES.
(Application filed July 6, 1897.)
(No Model.) 2 Sheets—Sheet 1.

WITNESSES:

INVENTORS:
Frederick H. Nies
William Dunn
BY
Henry Connett
ATTORNEY

THE NORRIS PETERS CO., PHOTO-LITHO., WASHINGTON, D. C.

No. 611,076. Patented Sept. 20, 1898.
F. H. NIES & W. DUNN.
GEAR CASE FOR BICYCLES.
(Application filed July 6, 1897.)

(No Model.) 2 Sheets—Sheet 2.

WITNESSES:
F. H. Himan
Peter A. Ross

INVENTORS:
Frederick H. Nies
William Dunn
BY
Henry Connett
ATTORNEY

UNITED STATES PATENT OFFICE.

FREDERICK H. NIES AND WILLIAM DUNN, OF NEW YORK, N. Y.

GEAR-CASE FOR BICYCLES.

SPECIFICATION forming part of Letters Patent No. 611,076, dated September 20, 1898.

Application filed July 6, 1897. Serial No. 643,521. (No model.)

*To all whom it may concern:*

Be it known that we, FREDERICK H. NIES, a citizen of the United States, residing at New York, (Brooklyn,) Kings county, and WILLIAM DUNN, a subject of the Queen of Great Britain, residing in the city and county of New York, State of New York, have invented certain new and useful Improvements in Gear-Cases for Bicycles, of which the following is a specification.

This invention relates to a separable case for inclosing the gearing—that is, the sprocket-wheels and chain—of a bicycle, the object being to provide a light and dust-proof case which will afford ready access to the gearing and which shall have facilities for adapting it to bicycle-frames which vary to a considerable extent in proportions.

In the accompanying drawings an embodiment of the invention is illustrated.

Figure 1:
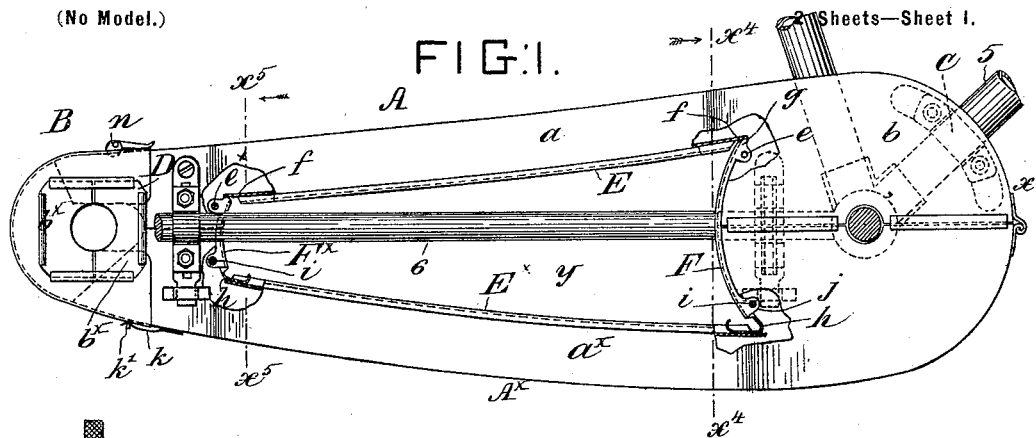
Figure 2:
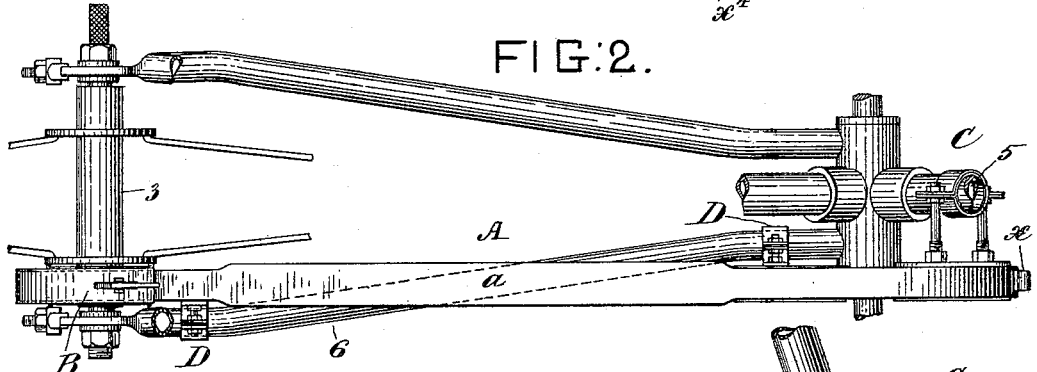
Figure 3:
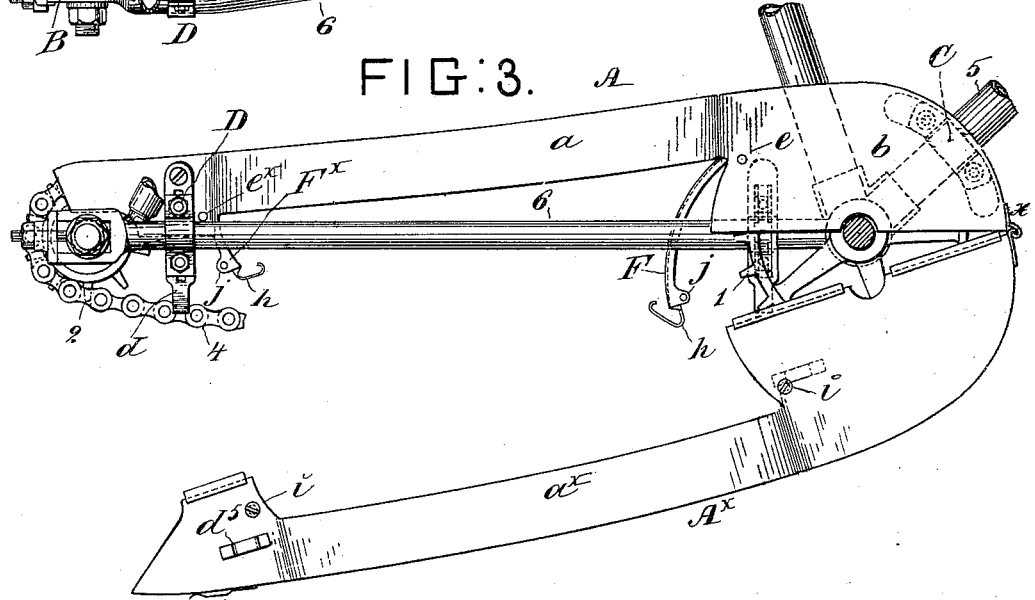
Figure 6:
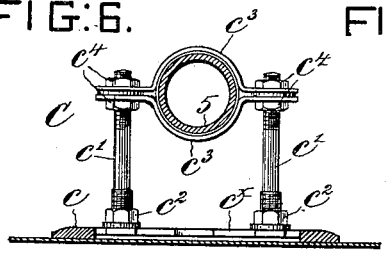
Figure 7:
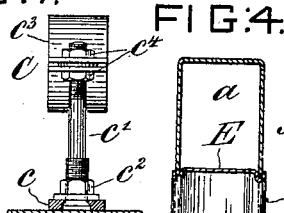
Figure 4:
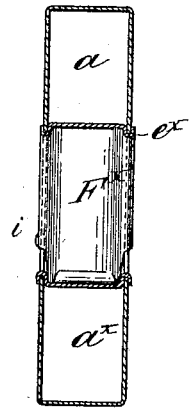
Figure 5:
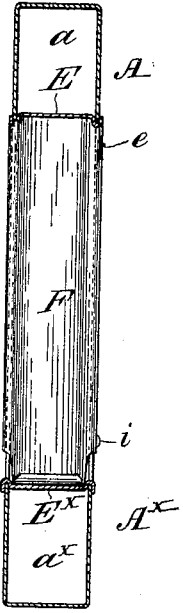
Figure 8:
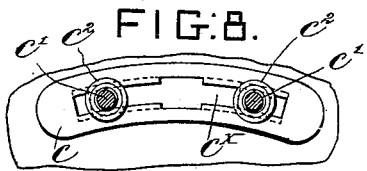
Figure 9:
Figure 10:
Figure 11:
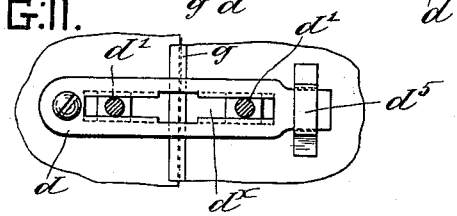
Figure 12:
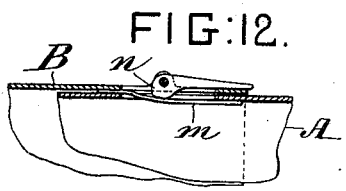

Figure 1 is a side elevation of the gear-case as it appears in position on the bicycle; and Fig. 2 is a plan of the same, showing also a part of the bicycle-frame in order to illustrate the mode of detachably securing the gear-case to the frame. Fig. 3 is a side view showing the case open and the closing-plates removed. Figs. 4 and 5 are cross-sections of the gear-case in the respective planes designated in Fig. 1 by the lines $x^4$ and $x^5$, but on a scale double that of Fig. 1. Figs. 6, 7, and 8 are views, on a larger scale, illustrating the construction of the clip for securing the front end of the gear-case to the upright member of the bicycle-frame. Figs. 9, 10, and 11 are similar views illustrating the construction of one of the clips for securing the gear-case to the horizontal member of the bicycle-frame. Fig. 12 is a sectional view illustrating the fastening for the housing B.

The gear-case is formed of thin stiff sheet material, preferably sheet-steel, and is as to its main portion or body in two sections, A and $A^\times$, hinged together at $x$, the upper section A being secured to the bicycle-frame and the lower section $A^\times$ being free to drop down when disengaged. The gear-case has a housing $b$ at its broader end for the larger sprocket-wheel 1, a housing B at its narrower end for the lesser sprocket-wheel 2, and two channels $a$ and $a^\times$ for the runs of the chain. The upper channel $a$ is in one with the section A, and the lower channel $a^\times$ is in one with the lower section $A^\times$. When the sections are brought together, the housing B is slipped over the ends of the sections and secured by suitable fastenings. Those shown herein will be hereinafter described. In the inner and outer faces of the housing B are mounted slides $b^\times$, adapted to embrace the hub 3 of the rear wheel of the bicycle. These slides are made to fit up close about the hub and by sliding in their keepers to permit of the hub being moved to and fro to a limited extent in adjusting the tension of the driving-chain 4.

The upper section A of the gear-case is provided with clips for securing it firmly but removably and adjustably to the frame of the bicycle, and these will now be described, with especial reference to Figs. 6 to 10, which show them more in detail.

The clip C for securing the case to the upright member 5 of the frame is illustrated in Figs. 6, 7, and 8, the former being a view from above, with the base in section, the next an edge view, and the latter a plan view of the base. In this clip, $c$ is the base-plate, which will be rigidly secured in any manner to the inner or back plate of the housing $b$, near its upper part, and set obliquely, as indicated by dotted lines in Fig. 1. In this base is a slot $c^\times$, extending lengthwise, in which are mounted two upright screw-posts $c'$, the heads of which engage the margins of the slots $c^\times$, as seen in Fig. 8. The posts may be adjusted along the slot $c^\times$ and when in proper position fixed by means of jam-nuts $c^2$. Mounted on the upper or outer ends of the posts $c'$ are the semicircular bands $c^3$, which embrace the member of the frame. These have holes in their flanged ends by which they are threaded over the posts, and when in place they may be adjusted up or down on the posts and when adjusted clamped fast by pairs of nuts $c^4$. Preferably the base $c$ and the slot $c^\times$ therein will be curved, as shown in Fig. 8, the radius of the curve being from the crank-shaft. The two clips D, by which the gear-case is secured to the horizontal member 6 of the frame, are alike, and one of them is clearly illustrated in Figs. 9, 10, and 11, which corresponds with Figs. 6, 7, and 8. The clip D, like that described, has a base $d$ with a slot $d^\times$ to receive posts $d'$, secured by jam-nuts $d^2$ when adjusted. These posts bear semicircular bands $d^3$ to embrace and clamp on the member 6 of the frame, and nuts $d^4$ on the posts serve to adjust the bands in and out on the posts and to clamp them on the member 6. Fig. 9 shows how when the two sections of the gear-case come together at the housings the edge of the thin metal of one section enters a channel $g$ formed on the edge of the other section, and thus locks the edges of the metal against lateral displacement and forms a dust-proof joint. As the clip D overlaps the joint between the sections A and A$^\times$ of the gear-case, only one end of the base $d$ can be permanently fixed, and this will be of course the upper end, which will be screwed, riveted, or otherwise securely fastened to the section A. The end of the base $d$ which overlaps the section A$^\times$ will take under a keeper $d^5$, fixed to the said section. These adjustable clips C and D are important in that while they hold the gear-case firm and rigid with respect to the frame they at the same time allow of a considerable degree of adjustment in two directions, and thus adapt the case to frames which vary in form and dimensions to a limited extent.

It will be noted that there is an aperture $y$ through the gear-case and that owing to the construction of the case the periphery of this aperture is left open when the case is closed, as in Fig. 1. To close this peripheral opening and stiffen the gear-case, cover plates or strips are employed, as shown in Figs. 1, 4, and 5, the outer plate of the gear-case being broken away at the angles of the opening or aperture $y$ in order to illustrate the construction. Two detachable cover-plates E and E$^\times$ are applied over the openings in the respective channels $a$ and $a^\times$, said plates having grooves formed along their margins to receive the edges of the channels $a$ and $a^\times$, thus forming dust-tight joints and preventing lateral spring of the sides of the channels. At the ends of the opening $y$ and closing, respectively, the rear of the housing $b$ and the front of the housing B are closing-plates F and F$^\times$. These plates are substantially alike, only differing in length, and they are not wholly detached. They are hinged at $e$ and $e^\times$, respectively, to the member A of the gear-case by screws, pins, or bolts, which pass through the case from side to side. The hinged plates have each a heel $g$ at its hinged end, which when the closing-plates are in place bear on the adjacent ends $f$ of the plate E, and at their free or lower ends each hinged plate has a toe $h$, which when the plates are in place bears on the adjacent end of the plate E$^\times$. When closed in, as seen in Fig. 1, the plates F and F$^\times$ are held in place each by a screw $i$, which passes through the side plates of the section A$^\times$ and through an apertured lug $j$ on the hinged plate. By removing the screws $i$ and swinging out the hinged plates F and F$^\times$ the plates E and E$^\times$ are freed, so that they can be taken out. These hinged plates have grooves along their edges to receive the edges of the gear-case plates, the same as the plates E and E$^\times$, and when these four closing-plates are in place they not only close the openings they cover against the dust, but materially stiffen the structure.

As before stated, the housing B slips over the rear end of the gear-case body and incloses the ends of the two sections thereof, and it has fastening devices for securing it to the two sections of the casing, one on top and one below. As here shown these two fastening devices are different. That below consists of an apertured spring-tongue $k$, which snaps over a stud $k'$. As shown in Fig. 1, the stud is on the housing B and the spring-tongue is on the section A$^\times$; but this is not important. Their positions may be reversed. At the upper side of the housing B the fastening here shown is different, and the construction is illustrated more in detail in Fig. 12. In the upper edge plate of the section A is formed an elongated slot, and fixed on the plate in said slot is a leaf-spring $m$. In the upper edge plate of the housing B is formed a slot or aperture, and at this aperture is mounted to rock in lugs on the housing a cam or eccentric $n$, with an operating-handle. When the housing is placed on the gear-case and the eccentric $n$ thus brought over the spring $m$, the eccentric is rotated by the handle, so as to press down firmly on the spring, as shown. This forms a firm yet cushion-like fastening, which is not apt to be disengaged by jars and which will not be impaired by wear in use.

It will be understood that the housing B embraces and confines the free ends of the hinged sections of the body of the gear-case and that it is slotted in both faces, so that it may pass the axle of the rear wheel of the bicycle. There are slides $b^\times$ also in both of its faces.

Having thus described our invention, we claim—

1. A gear-case for a bicycle comprising the two sections, A and A$^\times$, hinged together at their front end, a separable housing B, adapted to embrace the free, rear ends of said sections when the gear-case is in place, slides in said housing to embrace the rear axle and permit of its adjustment, movable cover-plates adapted to close the peripheral openings about the aperture $y$ in the gear-case, the end cover-plates being hinged to the upper, fixed section, and means for securing said upper section to the frame, substantially as set forth.

2. A gear-case for a bicycle comprising the two hinged sections A and A$^\times$, the removable housing adapted to embrace and inclose the free ends of said sections, the detachable cover-plates E and E$^\times$, closing the respective open channels for the chains, and the cover-plates F and F$^\times$, hinged to one of said sections of the gear-case and closing the respective housings, the said cover-plates having grooves along their edges to receive the edges of the plates forming the gear-case, substantially as set forth.

3. A gear-case for a bicycle comprising an upper section A, a lower section $A^\times$, and means for detachably securing them together, in combination with a clip mechanism for securing the upper section A to the member 6 of the bicycle-frame, said clip mechanism comprising a slotted base, $d$, fixed to the section A, overlapping the section $A^\times$ and adapted to take under a keeper $d^5$ on the last-named section, the said keeper, the screw-posts $d'$, mounted adjustably in the slot in said base, the jam-nuts $d^2$, for securing said posts in the base, the semicircular bands $d^3$ threaded on said posts, and the nuts $d^4$, on said posts, substantially as set forth.

4. An adjustable clip mechanism for securing a gear-case to the frame of a bicycle, comprising a slotted base or base-plate, adapted to be secured to the gear-case, two screw-threaded posts mounted in said slot, the bodies of the posts engaging said slot and the heads thereof taking under the margins thereof, the clasping-bands mounted adjustably on said posts, the jam-nuts on said posts, substantially as set forth.

5. The combination with a gear-case, of a clip C for securing said case at its front end to an inclined member of the bicycle-frame, said clip comprising a base having in it a curved slot $c^\times$, the two screw-posts $c'$, mounted adjustably in said slot and provided with securing-nuts $c^2$, the clamping-bands, threaded on the said posts, and the nuts $c^4$, on the posts, for adjusting and securing said bands, substantially as set forth.

6. The combination with the sections of the gear-case, of the housing B, adapted to fit over, embrace and inclose the ends of said sections, and the means for securing said housing in place, said means comprising a leaf-spring $m$, fixed in a slot in the end of the section of the gear-case, and a cam $n$, mounted in a slot in the housing and adapted, when the housing is in place, to press upon said spring when rotated, substantially as set forth.

In witness whereof we have hereunto signed our names in the presence of two subscribing witnesses.

FREDERICK H. NIES.
WILLIAM DUNN.

Witnesses:
HENRY CONNETT,
PETER A. ROSS.